(12) United States Patent
Jang et al.

(10) Patent No.: US 7,212,258 B2
(45) Date of Patent: May 1, 2007

(54) SURFACE LIGHT SOURCE DEVICE AND LIQUID CRYSTAL DISPLAY APPARATUS HAVING THE SAME

(75) Inventors: Hyeon-Yong Jang, Osan-si (KR); Dong-Woo Kim, Suwon-si (KR); Min-Gyu Kim, Seoul (KR)

(73) Assignees: Samsung Electronics Co., Ltd. (KR); Samsung Corning Co., Ltd. (KR)

( * ) Notice: Subject to any disclaimer, the term of this patent is extended or adjusted under 35 U.S.C. 154(b) by 225 days.

(21) Appl. No.: 10/980,709

(22) Filed: Nov. 3, 2004

(65) Prior Publication Data

US 2005/0141238 A1   Jun. 30, 2005

(30) Foreign Application Priority Data

Nov. 4, 2003   (KR) .................. 10-2003-0077456

(51) Int. Cl.
*G02F 1/1335* (2006.01)
*H01J 17/49* (2006.01)
(52) U.S. Cl. ........................................ 349/69; 313/587
(58) Field of Classification Search ............... 349/61, 349/69–71; 313/581–582, 586–587
See application file for complete search history.

(56) References Cited

U.S. PATENT DOCUMENTS 6,052,160 A * 4/2000 Bohmer et al. ............... 349/32
6,670,756 B2 * 12/2003 Lin et al. .................... 313/582

* cited by examiner

*Primary Examiner*—James A. Dudek
(74) *Attorney, Agent, or Firm*—Cantor Colburn LLP

(57) ABSTRACT

A surface light source device includes a light source body having an internal space. A partition wall is disposed in the internal space of the light source body to divide the internal space into a plurality of discharge spaces. The partition wall has end portions that make contact with inner surface of the light source body. The partition wall has a throughhole, through which the discharge spaces are connected to each other. The light source body includes a voltage applying part that applies a voltage to the discharge space to generate plasma in the discharge space. A barrier is disposed adjacent to the throughhole to restrict a flow of the plasma generated from a discharge gas through the throughhole. The barrier screens the throughhole to restrict the flow of the plasma through the throughhole. Therefore, uniformity of luminance of the surface light source device is improved.

22 Claims, 8 Drawing Sheets

US 7,212,258 B2

SURFACE LIGHT SOURCE DEVICE AND LIQUID CRYSTAL DISPLAY APPARATUS HAVING THE SAME

CROSS-REFERENCE TO RELATED APPLICATIONS

This application relies for priority upon Korean Patent Application No. 2003-77456 filed on Nov. 4, 2003, the contents of which are herein incorporated by reference in its entirety.

BACKGROUND OF THE INVENTION

1. Field of the Invention

The present invention relates to a surface light source device and a liquid crystal display apparatus having the surface light source device. More particularly, the present invention relates to a surface light source device capable of decreasing channeling, and a liquid crystal display apparatus having the surface light source device as a light source.

2. Description of the Related Art

Generally, liquid crystal has both electrical and optical characteristics. An arrangement of the liquid crystal is changed in response to a direction of electric field applied to the liquid crystal. Light transmittance of the liquid crystal is changed by the arrangement of the liquid crystal.

A liquid crystal display (LCD) apparatus displays an image by using the liquid crystal. The LCD apparatus has various characteristics, for example, such as a thin thickness, a small volume and a lightweight compared with a cathode ray tube (CRT). Thus, the LCD apparatus is widely used for a portable computer, a communication device, a television set, etc.

The LCD apparatus includes a liquid crystal controlling part that controls a liquid crystal, and a light providing part that provides the liquid crystal controlling part with a light.

The liquid crystal controlling part includes a plurality of pixel electrodes that are formed on a first substrate, a common electrode that is formed on a second substrate, and a liquid crystal that is interposed between the pixel electrode and the common electrode. A number of the pixel electrodes is determined by a resolution. Each of the pixel electrodes is electrically connected to a thin film transistor (TFT), so that a pixel voltage is applied to the pixel electrode through the TFT. A reference voltage is applied to the common electrode. The pixel electrode and the common electrode include transparent conductive material.

The light providing part provides the liquid crystal with the light. The light generated from the light providing part passes through the pixel electrode, the liquid crystal and the common electrode to display an image. A display quality of the liquid crystal display apparatus is determined by a luminance and a uniformity of the luminance of the light. That is, when the luminance and the uniformity of the luminance of the light generated from the light providing part are increased, the display quality of the liquid crystal display apparatus is improved.

Generally, the light providing part may include a cold cathode fluorescent lamp (CCFL) or a light emitting diode (LED). The CCFL has various characteristics, for example, such as a high luminance, a long lifespan, a low heating value etc., and the LED has also various characteristics, for example, such as a low power consumption, a high luminance, etc.

However, the luminance of the CCFL and the LED is not uniform. In order to increase the uniformity of the luminance, the light providing part includes a light guide plate, a diffusion member, a prism sheet, etc.

When the light providing part includes the light guide plate, the diffusion member and the prism sheet, a size and a weight of a liquid crystal display apparatus are increased.

A surface light source device having a flat plate shape has uniform luminance. A conventional surface light source device includes a first substrate and a second substrate corresponding to the first substrate. A plurality of partition walls is disposed between the first and second substrates. The partition walls are disposed in substantially parallel with one another, and the partition walls are spaced apart from one another by a predetermined interval to form discharge spaces between the first and second substrates. A sealing member is disposed between the first and second substrates to isolate the discharge space from an exterior. A discharge gas is injected into the discharge space. Two electrodes that apply a voltage to the discharge gas are disposed on outer surfaces of the first and second substrates.

The partition walls are arranged so that the discharge spaces form a serpentine shape. The discharge spaces are connected to one another. That is, odd numbered partition walls have a first end portion that makes contact with the sealing member and a second end portion that is spaced apart from the sealing member to form a connection passage, and even numbered partition walls have a first end portion that is spaced apart from the sealing member to form a connection passage and a second end portion that makes contact with the sealing member.

When pressures of the discharge gas in the discharge spaces are different from one another, electric field strengths applied to the discharge spaces may be different from one another. When the discharge spaces are connected to one another by the connection passage, plasma may abruptly move through the connection passage to form a channeling between the discharge spaces. That is, when the electric field strengths are different from one another, densities of the plasma in the discharge spaces are different from one another so that a portion of the plasma moves toward one of the discharge space, which has lower density of the plasma, thereby forming the channeling. When the channeling is formed in the discharge spaces, the uniformity of the luminance is deteriorated.

SUMMARY OF THE INVENTION

Therefore, regarding above-mentioned disadvantages of the related arts, the present invention provides a surface light source device capable of restricting flow of plasma between adjacent discharge spaces to decrease the channeling.

The present invention also provides a liquid crystal display apparatus having the above-mentioned surface light source device.

A surface light source device in accordance with an aspect of the present invention includes a light source body having an internal space. A partition wall is disposed in the internal space of the light source body to divide the internal space into a plurality of discharge spaces. The partition wall has end portions that make contact with inner surface of the light source body. The partition has a throughhole, through which the discharge spaces are connected to each other. A voltage applying part applies a voltage to the discharge gas to generate plasma in the discharge space. A barrier is disposed adjacent to the throughhole to restrict a flow of the plasma generated from the discharge gas through the throughhole.

A liquid crystal display apparatus in accordance with another aspect of the present invention includes a surface light source device and a liquid crystal display panel. The surface light source device includes a light source body that has an internal space, a partition wall disposed in the internal space to divide the internal space into a plurality of discharge spaces, the partition wall having end portions that make contact with inner surface of the light source body and a throughhole, through which the discharge spaces are connected to each other, and a barrier that is disposed adjacent to the throughhole to restrict a flow of plasma generated from a discharge gas through the throughhole. The liquid crystal display panel includes liquid crystal to convert a light generated from the surface light source device into an image light.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE EMBODIMENTS

Hereinafter, the embodiments of the present invention will be described in detail with reference to the accompanied drawings.

Figure 1:
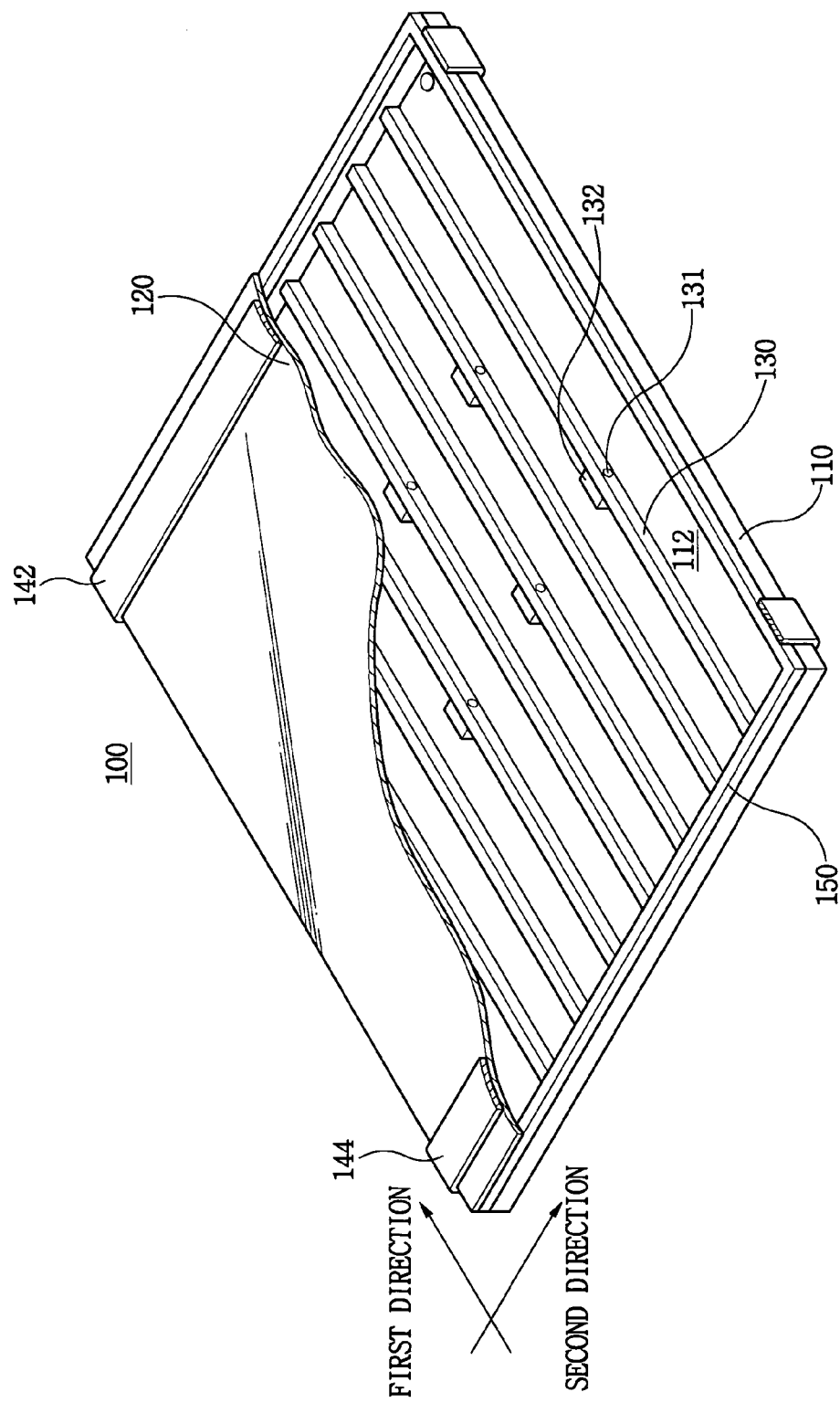
FIG. 1 is a partially cutout perspective view illustrating a surface light source device in accordance with an exemplary embodiment of the present invention.
Figure 2:
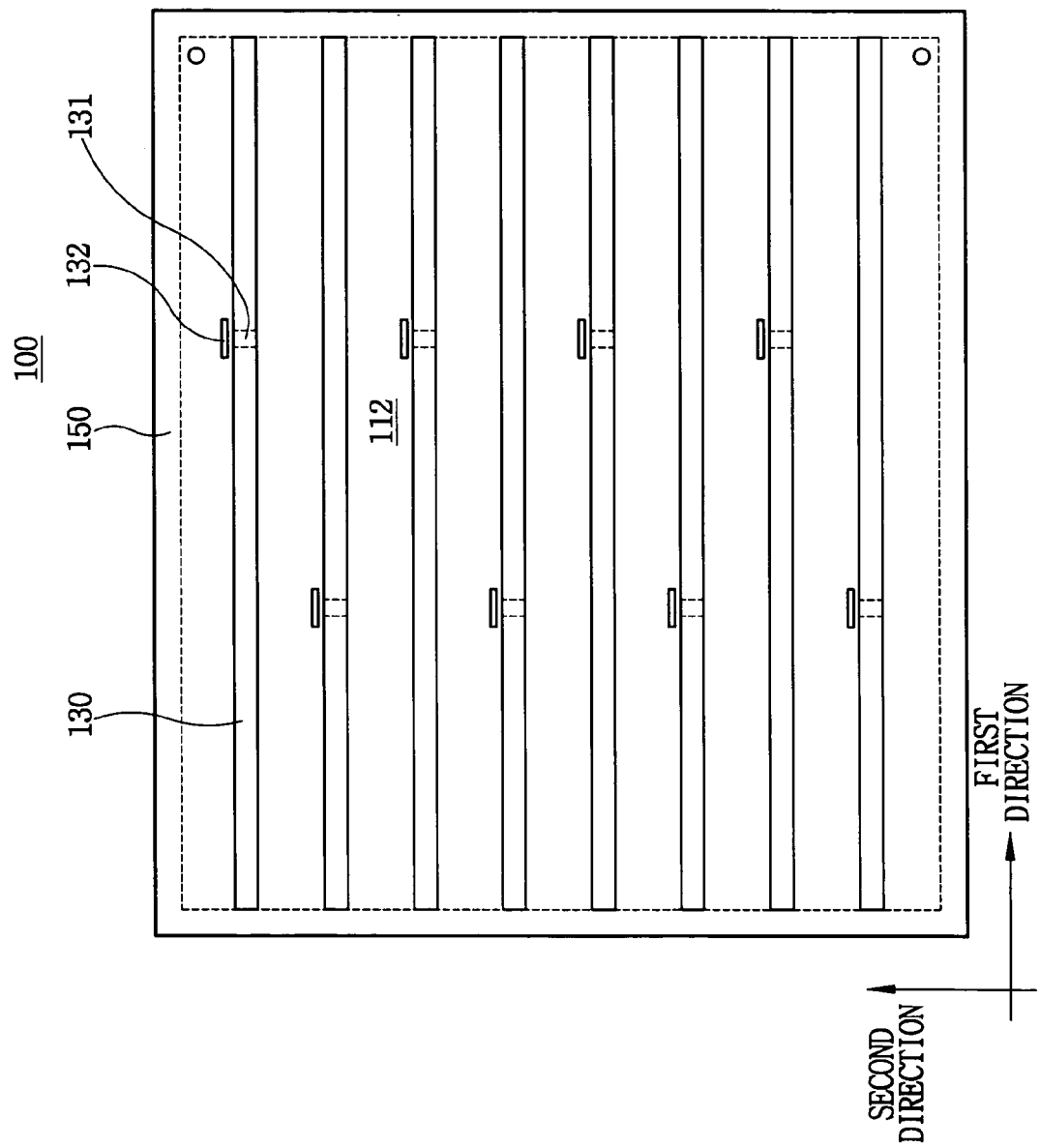
FIG. 2 is a plan view illustrating the surface light source device of FIG. 1.
Figure 3:
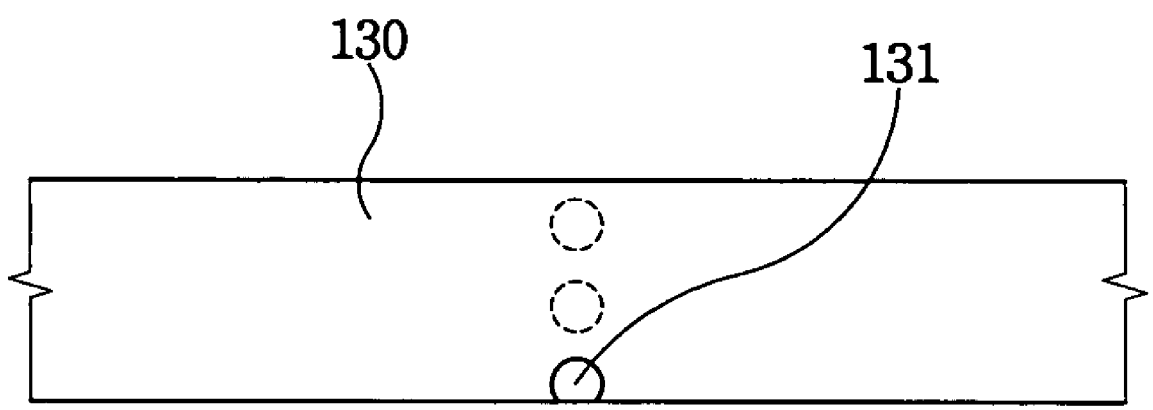
FIG. 3 is a cross-sectional view illustrating a partition wall of the surface light source device of FIG. 2.

FIG. 1 is a partially cut-out perspective view illustrating a surface light source device in accordance with an exemplary embodiment of the present invention. FIG. 2 is a plan view illustrating the surface light source device of FIG. 1. FIG. 3 is a cross-sectional view illustrating a partition wall of the surface light source device of FIG. 2.

Referring to FIGS. 1 to 3, a surface light source device 100 includes a light source body 101, partition walls 130, a first electrode 142 and a second electrode 144. The light source body 101 includes a first substrate 110, a second substrate 120 and a sealing member 150.

In the present embodiment, the first and second substrates 110 and 120 are glass substrates. Visible light may pass through the glass substrates, and ultraviolet light may not pass through the glass substrates. The second substrate 120 corresponds to the first substrate 110. The first and second substrates 110 and 120 are spaced apart from each other. In the present embodiment, a thickness of the second substrate 120 is about one-third of that of the first substrate 110. However, the thicknesses of the first and second substrates 110 and 120 are not limited to the aforementioned thickness. Alternatively, the second substrate 120 may have substantially equal thickness to the first substrate 110.

A first fluorescent layer (not shown) and a second fluorescent layer (not shown) may be disposed on an inner surface of the first substrate 110 and an inner surface of the second substrate 120, respectively. In addition, a reflecting layer (not shown) may be disposed between the first substrate 110 and the first fluorescent layer (not shown).

The sealing member 150 having a rectangular shape is interposed between a peripheral portion of the first substrate 110 and a peripheral portion of the second substrate 120. An upper surface of the sealing member 150 makes contact with a lower surface of the second substrate 120, and a lower surface of the sealing member 150 makes contact with an upper surface of the first substrate 110. Therefore, the first and second substrates 110 and 120, and the sealing member 150 form an internal space. The internal space is sealed by the sealing member 150. In the present embodiment, the sealing member 150 preferably has a substantially equal thermal expansion coefficient with respect to the first and second substrates 110 and 120.

A plurality of partition walls 130 is disposed between the first and second substrates 110 and 120 to divide the internal space into a plurality of discharge spaces 112. Each of the partition walls 130 has a plate shape that is extended in a first direction. The partition walls 130 are disposed in substantially parallel with one another by a predetermined interval. The partition walls 130 include transparent or opaque material. The partition walls 130 include a thermally curable material or an ultraviolet curable material. The discharge gas is injected into the discharge spaces 112.

Referring to FIG. 2, each of the partition walls 130 has two end portions. The end portions make contact with inner surface of the sealing member 150 so that the discharge spaces 112 are isolated from one another by the partition walls 130. A throughhole 131 is formed at each of the partition walls 130 so that the discharge spaces 112 are connected to one another. In the present embodiment, the surface light source device 100 includes a plurality of the throughholes 131. Therefore, the discharge gas may be injected into the discharge spaces 112 through the throughholes 131. Preferably, the throughholes 131 are arranged in a zig-zag shape, so that the throughholes 131 are alternately arranged in a second direction that is in substantially perpendicular to the first direction.

Referring to FIG. 3, each of the throughholes 131 may be disposed at a lower portion of one of the partition walls 130 adjacent to the first substrate 110, an upper portion of one of the partition walls 130 adjacent to the second substrate 120, or a central portion of one of the partition walls 130. In the present embodiment, each of the throughholes 131 is disposed at the lower portion of the partition wall 130, and a density of a lower portion of the plasma is lower than that of an upper portion of the plasma. Therefore, the discharge gas may flow freely through the throughhole 131, while a movement of the plasma between adjacent discharge spaces 112 is restricted. The throughhole 131 may have various shapes, for example, such as a circular shape, a rectangular shape, a triangular shape, etc.

The surface light source device 100 has a barrier 132 to decrease channeling between the adjacent discharge spaces 112. In the present embodiment, the surface light source device 100 has a plurality of the barriers 132. As shown in FIG. 2, each of the barriers 132 has a flat plate shape. Each of the barriers 132 is disposed on the first substrate 110. The barriers 132 are disposed in substantially parallel with the partition wall 130. Each of the barriers 132 is disposed adjacent to each of the throughholes 131 so that the throughhole 131 is blocked by the barrier 132. A height of the barrier 132 is no less than a diameter of the throughhole 131 to restrict the flow of the plasma through the throughhole 131. That is, the barrier 132 increases a length of a flow path of the plasma that passes through the throughhole 131, thereby preventing the channeling. In this exemplary embodiment, the barrier 132 is disposed adjacent to the throughhole 131 to restrict flow of the plasma by the throughhole 131 while the discharge gas may freely move through the throughhole 131. The barrier 132 may be spaced apart from the partition wall 130 by about one millimeter.

In the present embodiment, the barrier 132 may include substantially same material as the partition wall 130. The barrier 132 may include mortar. The partition wall 130 is formed on the first substrate 110 by a screen printing method, so that the barrier 132 may be formed from a same layer as the partition wall 130.

Referring to FIG. 1, the first electrode 142 and the second electrode 144 are disposed on outer surfaces of the first and second substrates 110 and 120. Particularly, the first electrode 142 surrounds the outer surfaces of the first and second substrates 110 and 120 corresponding to the first end portion of the partition wall 130. The second electrode 144 surrounds the outer surfaces of the first and second substrates 110 and 120 corresponding to the second end portion of the partition wall 130. The second electrode 144 is spaced apart from the first electrode 142. The first and second electrodes 142 and 144 are extended in the second direction. Alternatively, at least one of the first and second electrodes 142 and 144 may be disposed in the discharge space 112.

The discharge gas is introduced into the discharge spaces 112 that are divided by the partition walls 130. That is, the discharge gas is injected into the discharge spaces 112 through the throughholes 131. The discharge gas includes, for example, mercury (Hg), neon (Ne), and so on. The discharge gas may further include argon (Ar), krypton (Kr), xenon (Xe), etc., so as to generate a penning effect.

When voltages are applied to the first and second electrodes 142 and 144, an electric field is applied to the discharge gas so that the discharge gas is excited to generate the plasma in the discharge spaces 112. When the electric field strengths applied to the discharge spaces 112 are different from one another, a portion of the plasma is concentrated on one of the discharge spaces 112 where higher electric field strength is applied.

The plasma flows between the discharge spaces 112 through the throughholes 131. The density of the lower portion of the plasma is lower than that of the upper portion of the plasma so that each of the throughholes 131 is disposed at the lower position of each of the partition walls 130. Therefore, the flow of the plasma is restricted by the barrier 132. Furthermore, the barrier 132 increases the length of the flow path of the plasma. Therefore, channeling between the adjacent discharge spaces 112 is decreased.

In this exemplary embodiment, the barrier 132 is disposed at one side of the throughhole 131.

Figure 4:
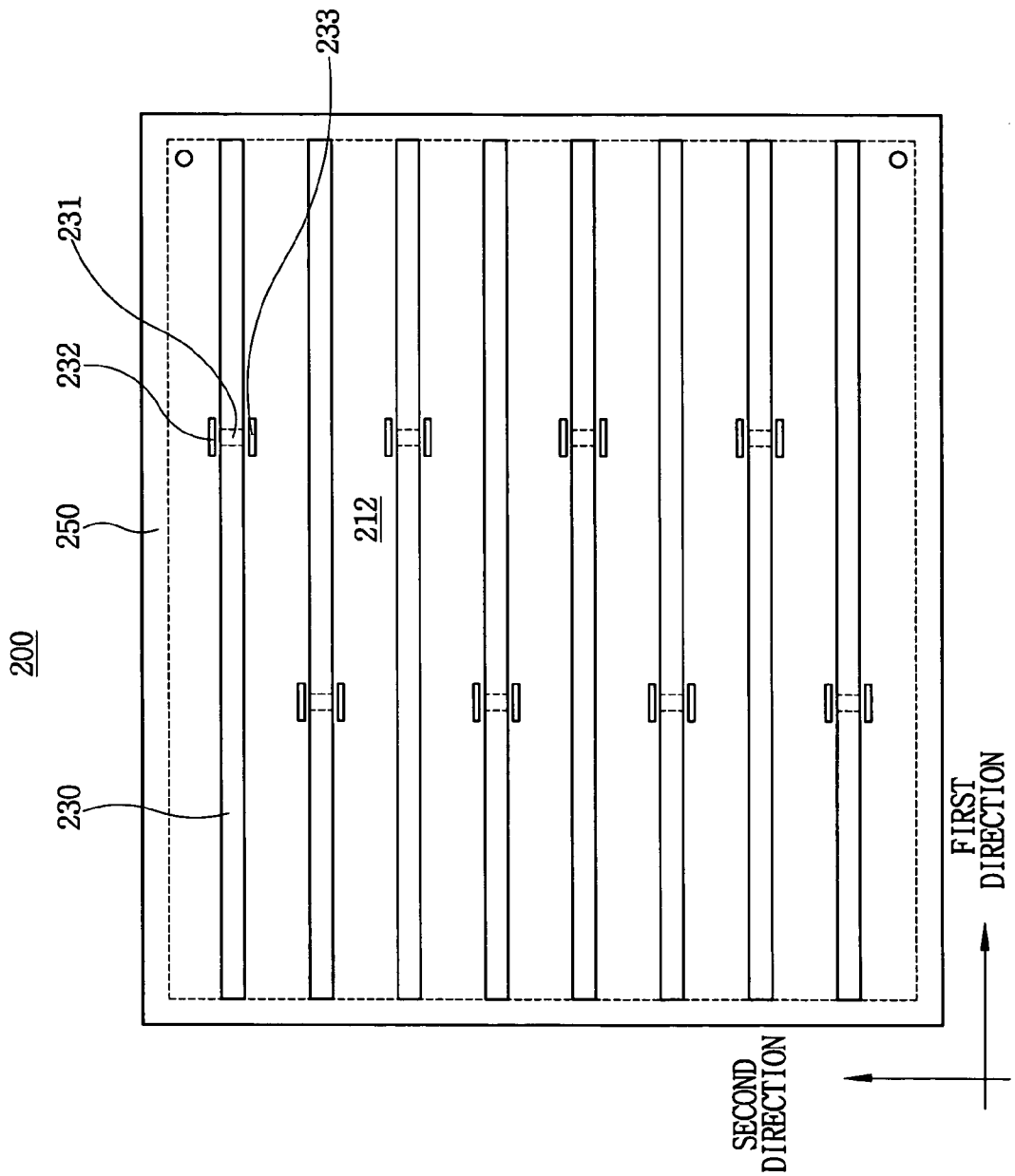
FIG. 4 is a plan view illustrating a surface light source device in accordance with another exemplary embodiment of the present invention.

FIG. 4 is a plan view illustrating a surface light source device in accordance with another exemplary embodiment of the present invention.

Referring to FIG. 4, a surface light source device 200 has a barrier 232 and an auxiliary barrier 233. The barrier 232 is disposed adjacent to a throughhole 231 formed at a partition wall 230. The auxiliary barrier 233 is disposed opposite to the barrier 232 with respect to the partition wall 230. Therefore, flow of plasma through the throughhole 231 is restricted.

Figure 5:
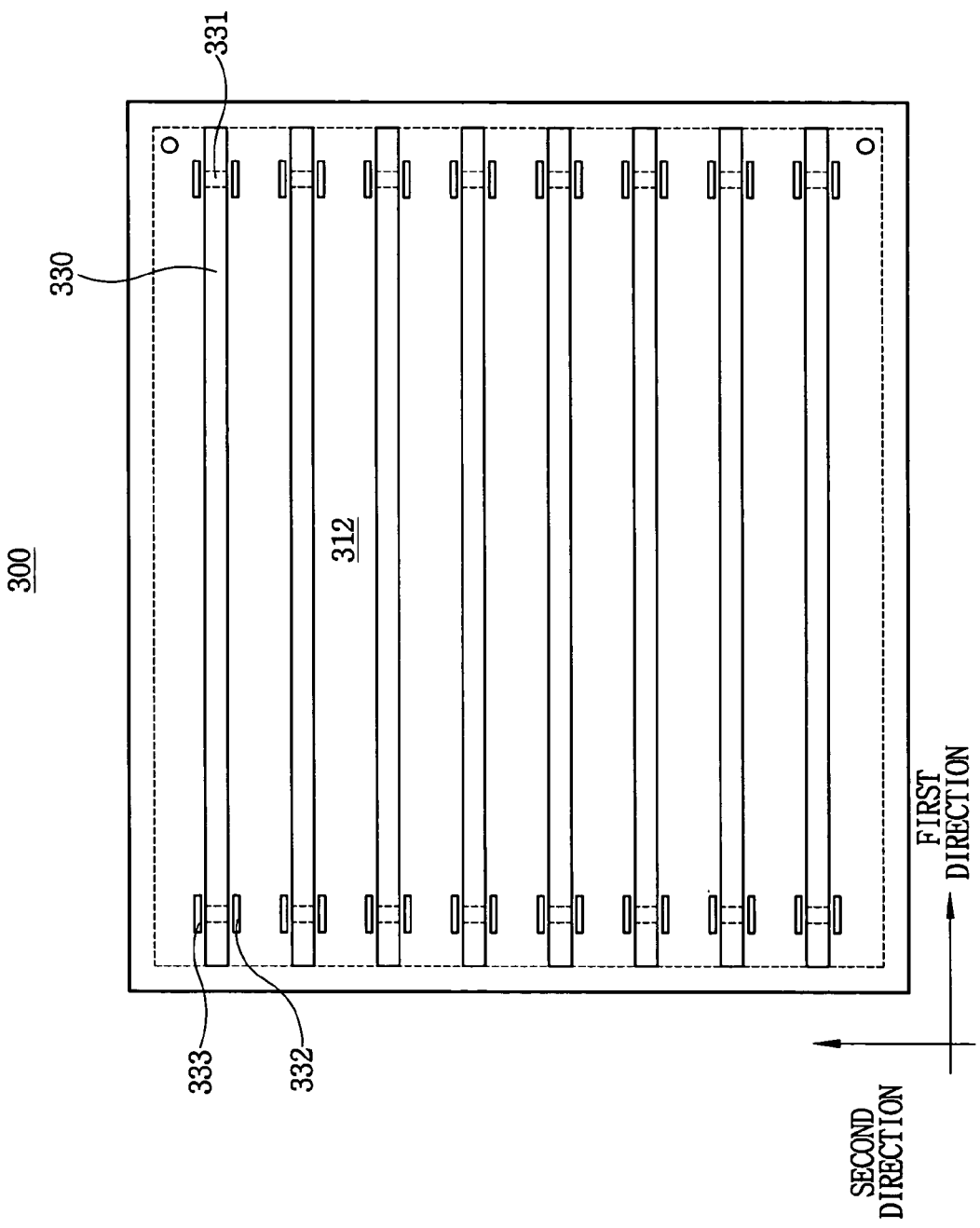
FIG. 5 is a plan view illustrating a surface light source device in accordance with still another exemplary embodiment of the present invention.
Figure 6:
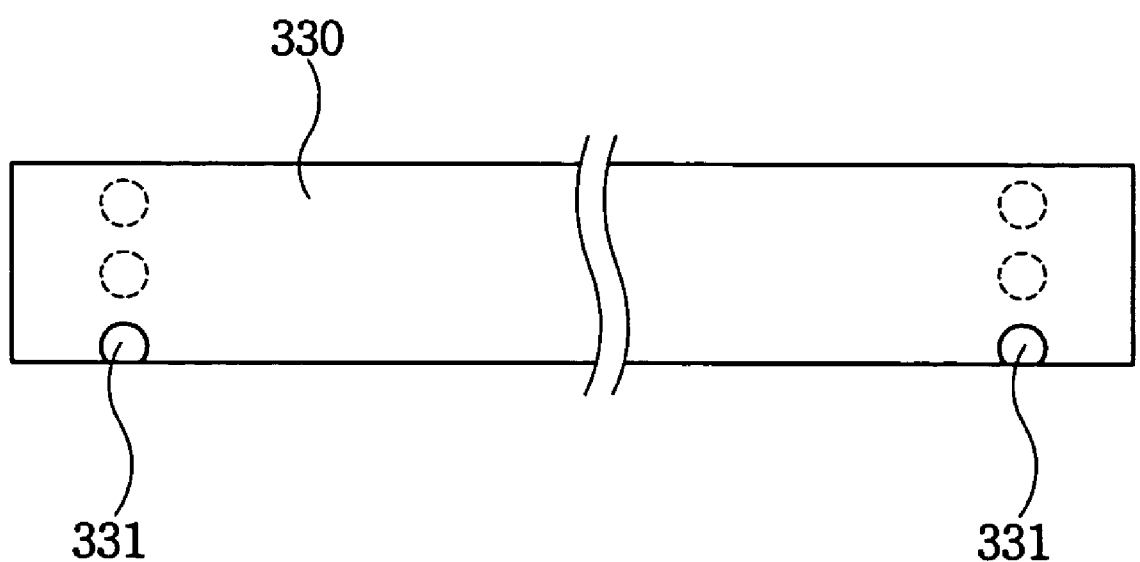
FIG. 6 is a cross-sectional view illustrating a partition wall of the surface light source device of FIG. 5.

FIG. 5 is a plan view illustrating a surface light source device in accordance with still another exemplary embodiment of the present invention. FIG. 6 is a cross-sectional view illustrating a partition wall of the surface light source device of FIG. 5.

Referring to FIG. 5, a surface light source device 300 is same as the surface light source device 100 in FIG. 2 except for positions of a throughhole and a barrier. Thus, any further explanation except for a throughhole and a barrier will be omitted.

Two throughholes 331 are disposed at both sides of each of partition walls 330. The throughholes 331 correspond to a first electrode 342 and a second electrode 344. A barrier 332 and an auxiliary barrier 333 are disposed adjacent to the throughholes 331 to restrict a flow of the plasma through the throughholes 331, respectively.

Referring to FIG. 6, the throughholes 331 are disposed at a lower portion of the partition wall 330. The throughhole 331 may be formed at a central portion or an upper portion of the partition wall 330.

Figure 7:
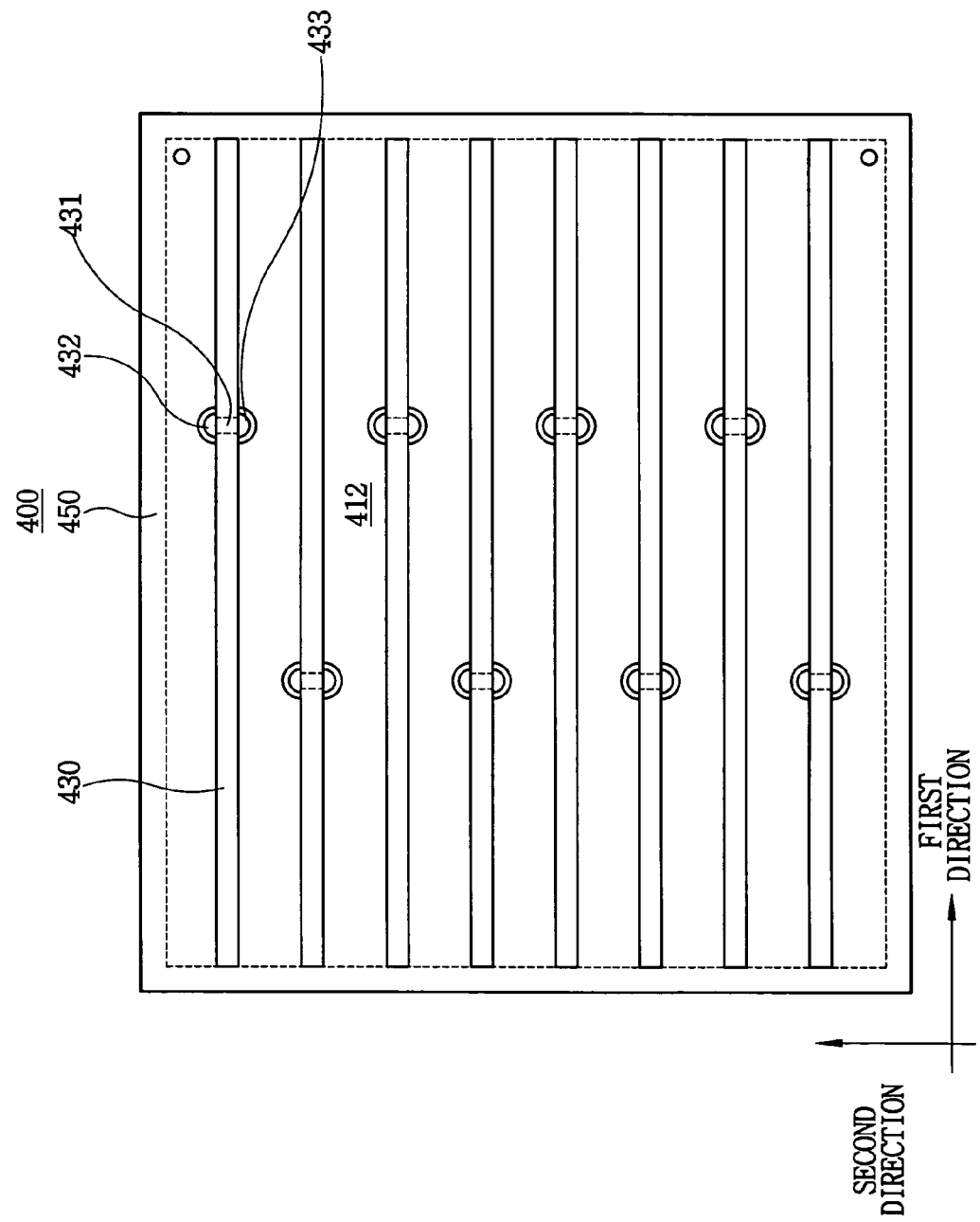
FIG. 7 is a plan view illustrating a surface light source device in accordance with still another exemplary embodiment of the present invention.

FIG. 7 is a plan view illustrating a surface light source device in accordance with still another exemplary embodiment of the present invention.

Referring to FIG. 7, a surface light source device 400 in accordance with the present embodiment is same as the surface light source device 100 in FIG. 2 except for a shape of a barrier. Thus, any further explanation except for a barrier will be omitted.

A barrier 432 and an auxiliary barrier 433 have semi-elliptical shapes, respectively. The barrier 432 and the auxiliary barrier 433 are disposed adjacent to a throughhole 431. The barrier 432 and the auxiliary barrier 433 make contact with the partition wall 430. The barrier 432 and the auxiliary barrier 433 may have various shapes, for example, such as a rectangular shape, a triangular shape, a semi-circular shape, etc.

A flow path of plasma that has passed through the throughhole 431 may be in substantially perpendicular to a surface of a first substrate (not shown) so that a length of the flow path is increased. That is, the plasma may jump the barrier 432 and the auxiliary barrier 433 so that the plasma may flow between discharge spaces 412. Therefore, the flow of the plasma in a lower region than the barriers 432 and 433 is restricted by the barrier 432 and the auxiliary barrier 433. The flow of the plasma between the neighboring discharge spaces 412 is greatly decreased.

Figure 8:
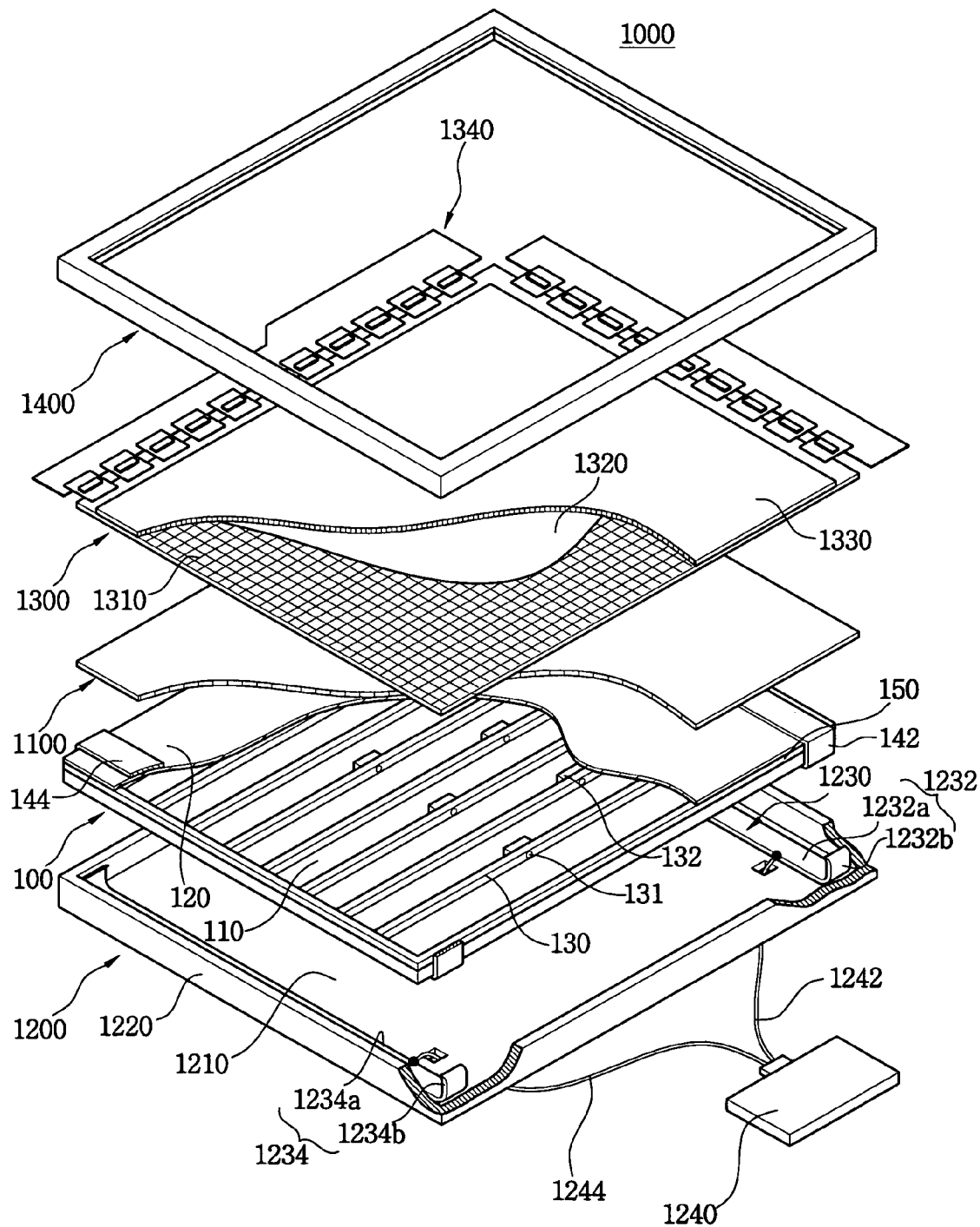
FIG. 8 is an exploded perspective view illustrating a liquid crystal display apparatus having the surface light source device of FIG. 1.

FIG. 8 is an exploded perspective view illustrating an LCD apparatus having the surface light source device of FIG. 1.

Referring to FIG. 8, an LCD apparatus 1000 includes a receiving container 1200, a surface light source device 100, an LCD panel 1300 and a chassis 1400. The surface light source device 100 of the present embodiment is same as the surface light source device illustrated in FIG. 1. Thus, any further explanation will be omitted.

The receiving container 1200 includes a bottom plate 1210, a plurality of sidewalls 1220, a discharge voltage applying module 1230 and an inverter 1240. The sidewalls 1220 are protruded from sides of the bottom plate 1210 to form a receiving space to receive the surface light source device 100 and the LCD panel 1300.

The bottom plate 1210 is larger than the surface light source device 100, and the bottom plate 1210 has a substantially identical shape to the surface light source device 100. The bottom plate 1210 has a rectangular shape.

The discharge voltage applying module 1230 applies a first discharge voltage and a second discharge voltage to the first and second electrodes 142 and 144, respectively. The discharge voltage applying module 1230 includes a first discharge voltage applying part 1232 and a second discharge voltage applying part 1234. The first discharge voltage applying part 1232 includes a first conductive body 1232a and a first conductive clip 1232b disposed on the first conductive body 1232a. The second discharge voltage applying part 1234 includes a second conductive body 1234a and a second conductive clip 1234b disposed on the second conductive body 1234a.

First and second electrodes 142 and 144 of the surface light source device 100 are combined with the first and second conductive clips 1232b and 1234b, respectively.

The inverter 1240 applies the first and second discharge voltages to the first and second discharge voltage applying parts 1232 and 1234, respectively. The inverter 1240 is electrically connected to the first discharge voltage applying part 1232 via a first conducting wire 1242, and the inverter 1240 is electrically connected to the second discharge voltage applying part 1234 via a second conducting wire 1244.

The LCD panel 1300 converts a light generated from the surface light source device 100 into an image light. The LCD panel 1300 includes a TFT substrate 1310, a liquid crystal layer 1320, a color filter substrate 1330 and a driving module 1340.

The TFT substrate 1310 includes pixel electrodes, a TFT, a gate line and a data line. The pixel electrodes are arranged in a matrix shape. The TFT applies a driving voltage to the pixel electrodes.

The color filter substrate 1330 includes a color filter and a common electrode. The color filter corresponds to the pixel electrode. The common electrode is formed on the color filter.

The liquid crystal layer 1320 is interposed between the TFT substrate 1310 and the color filter substrate 1330.

The chassis 1400 surrounds sides of the color filter substrate 1330, and the chassis 1400 is combined with the receiving container 1200. The chassis 1400 protects the LCD panel 1300 from an impact that is provided from an exterior to the LCD panel 1300.

A diffusing member 1100 is disposed between the surface light source device 100 and the LCD panel 1300 to diffuse the light generated from the surface light source device 100.

Experiments

Table 1 represents on/off test of five examples of surface light source devices.

TABLE 1

| No. | applied voltage (V) | output current (mA) | frequency (kHz) | aborted/tried |
|---|---|---|---|---|
| I | 120 | — | 48.0 | 28/30 |
| II | 120 | 130 | 48.2 | 10/30 |
| III | 120 | 132 | 48.2 | 7/30 |
| IV | 120 | 134 | 48.6 | 3/30 |
| V | 120 | 125 | 48.5 | 1/30 |

The first surface light source device I corresponds to a conventional surface light source device including partition walls having a serpentine shape. The second to fourth surface light source devices II, III and IV correspond to surface light source devices including partition walls having throughholes. The fifth surface light source device V corresponds to a surface light source device including a partition wall having a throughhole and a barrier.

Throughholes of the second to fifth surface light source device II, III, IV and V were formed at a central portion of the partition walls with respect to a longitudinal direction of the partition walls. A diameter of the throughhole of the second surface light source device II was about 0.46 mm. The throughhole of the second surface light source device II was disposed on a central portion of the partition wall thereof. A diameter of the throughhole of the third surface light source device III was about 0.42 mm. The throughhole of the third surface light source device III was disposed on a central portion of the partition wall thereof. A diameter of the throughhole of the fourth surface light source device IV was about 0.42 mm. The throughhole of the fourth surface light source device IV was disposed on a lower portion of the partition wall thereof.

A diameter of the throughhole of the fifth surface light source device V was about 0.5 mm. The throughhole of the fifth surface light source device V was disposed on a lower portion of the partition wall thereof. A width of each of discharge spaces formed in the first to fifth surface light source devices I, II, III, IV and V was about 9.8 mm. A height of each of the discharge spaces formed in the first to fifth surface light source devices I, II, III, IV and V was about 2.4 mm. A length of an electrode disposed on an upper substrate of the first to fifth surface light source devices I, II, III, IV and V was about 20 mm, and a length of the electrode disposed on a lower substrate of the first to fifth surface light source devices I, II, III, IV and V was about 25 mm. The barrier of the fifth surface light source device V had a flat plate shape having about 1×1 mm. The barrier of the fifth surface light source device V was spaced apart from the partition wall by about one millimeter.

Mercury getters were heated twice for about 20 seconds using a high frequency heater to inject mercury gas into each of the first to fifth surface light source devices I, II, III, IV and V. A number of the mercury getters was twenty. A length of each of the mercury getters was 4.7 millimeters. A gas mixture having neon gas and argon gas that were mixed at a ratio of 9:1 by weight was injected into each of the discharge spaces. A pressure of the gas mixture was no more than about 50 Torr.

The on/off tests of each of the first to fifth surface light source devices I, II, III, IV and V were performed under the aforementioned conditions. An electrical power was intermittently applied to each of the first to fifth surface light source devices I, II, III, IV and V. As shown in Table 1, total number of the on/off tests of each of the first to fifth surface light source devices I, II, III, IV and V was 30. A voltage of about 120V was applied to each of the first to fifth surface light source devices I, II, III, IV and V.

When one of the discharge spaces of the first to fifth surface light source devices I, II, III, IV and V was aborted, the aborted discharge space did not generate a light so that uniformity of luminance of the surface light source device was deteriorated. A number of abortion of the first surface light source I was 28. A number of abortion of the second surface light source II was 10. A number of abortion of the third surface light source III was 7. A number of abortion of the fourth surface light source IV was 3. A number of abortion of the fifth surface light source V was 1. When end portions of each of the partition walls made contact with inner surface of the light source body to isolate the discharge spaces from one another by the partition walls and each of the partition walls had the throughhole, the uniformity of the luminance of the surface light source device was greatly increased. In addition, when the throughhole was disposed on a lower portion of the partition wall, the uniformity of the luminance of the surface light source device was improved to prevent a channeling.

According to the present invention, a surface light source device includes a barrier disposed adjacent to a throughhole to restrict a movement of plasma so that a channeling is decreased, thereby improving uniformity of luminance of the surface light source device. In addition, the surface light source device includes an auxiliary barrier so that the channeling is greatly decreased. Furthermore, end portions of the barrier make contact with the partition wall to restrict a flow of the plasma.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A surface light source device, comprising:
a light source body having an internal space;
a partition wall in the internal space to divide the internal space into a plurality of discharge spaces, the partition wall having end portions that make contact with inner surface of the light source body and a throughhole, through which the discharge spaces are connected to each other; and
a barrier that is disposed in a discharge space and adjacent to the throughhole to restrict a flow of plasma generated from a discharge gas through the throughhole.

2. The surface light source device of the claim 1, wherein the light source body comprises:
a first substrate;
a second substrate corresponding to the first substrate; and
a sealing member between the first and second substrates to form the internal space.

3. A surface light source device, comprising:
a light source body having an internal space;
a partition wall in the internal space to divide the internal space into a plurality of discharge spaces, the partition wall having end portions that make contact with inner surface of the light source body and a throughhole, through which the discharge spaces are connected to each other; and
a barrier that is disposed adjacent to the throughhole to restrict a flow of plasma generated from a discharge gas through the throughhole;
wherein the throughhole is formed at a portion of the partition wall where a density is lower than a remaining portion of the partition wall.

4. The surface light source device of the claim 3, further comprising a plurality of partition walls, wherein each of the throughholes is formed at a central portion of each of the partition walls, respectively.

5. The surface light source device of the claim 4, wherein each of the throughholes is spaced apart from the end portions of each of the partition walls, and the throughholes are alternately arranged in a direction in substantially perpendicular to a longitudinal direction of the partition walls.

6. The surface light source device of the claim 3, wherein each of the partition walls includes a plurality of throughholes, and each of the throughholes is disposed adjacent to the end portions of each of the partition walls.

7. A surface light source device, comprising:
a light source body having an internal space;
a partition wall in the internal space to divide the internal space into a plurality of discharge spaces, the partition wall having end portions that make contact with inner surface of the light source body and a throughhole, through which the discharge spaces are connected to each other; and
a barrier that is disposed adjacent to the throughhole to restrict a flow of plasma generated from a discharge gas through the throughhole:
wherein the barrier has a height lower than the partition wall; and
wherein the barrier has a height higher than the throughhole.

8. The surface light source device of the claim 7, wherein the barrier is spaced apart from the partition wall.

9. The surface light source device of the claim 8, wherein the barrier is spaced apart from the partition wall by about one millimeter.

10. The surface light source device of the claim 7, wherein end portions of the barrier make contact with the partition wall.

11. A surface light source device, comprising:
a light source body having an internal space;
a partition wall in the internal space to divide the internal space into a plurality of discharge spaces, the partition wall having end portions that make contact with inner surface of the light source body and a throughhole, through which the discharge spaces are connected to each other;
a barrier that is disposed adjacent to the throughhole to restrict a flow of plasma generated from a discharge gas through the throughhole; and
an auxiliary barrier disposed opposite to the barrier with respect to the partition wall.

12. The surface light source device of the claim 1, further comprising a voltage applying part that applies a voltage to the discharge space.

13. The surface light source device of the claim 12, wherein the voltage applying part comprises electrodes that surround outer surface of the light source body along a direction substantially perpendicular to a longitudinal direction of the partition wall.

14. A surface light source device, comprising:
a first substrate;
a second substrate corresponding to the first substrate;
a sealing member between the first and second substrates to form an internal space;
a partition wall in the internal space to divide the internal space into a plurality of discharge spaces, the partition wall having end portions that make contact with inner surface of the sealing member and a throughhole, through which the discharge spaces are connected to each other;
a voltage applying part that is disposed on outer surfaces of the first and second substrates to apply a voltage to the discharge space so as to generate plasma; and
a barrier that is disposed in a discharge space and adjacent to the throughhole to restrict a flow of the plasma through the throughhole.

15. The surface light source device of the claim 14, wherein the throughhole is formed at a portion of the partition wall where a density is lower than a remaining portion of the partition wall.

16. The surface light source device of the claim 15, further comprising a plurality of partition walls, wherein each of the throughholes is spaced apart from the end portions of each of the partition walls, and the throughholes are alternately arranged in a direction in substantially perpendicular to a longitudinal direction of the partition walls.

17. The surface light source device of the claim 15, wherein each of the partition walls includes a plurality of throughholes, and each of the throughholes is disposed adjacent to the end portions of each of the partition walls.

18. The surface light source device of the claim 14, wherein the barrier has a height lower than the partition wall, and the barrier has a height higher than the throughhole.

19. The surface light source device of the claim 18, wherein the barrier is spaced apart from the partition wall.

20. The surface light source device of the claim 18, wherein end portions of the barrier make contact with the partition wall.

21. The surface light source device of the claim 14, further comprising an auxiliary barrier disposed opposite to the barrier with respect to the partition wall.

22. A liquid crystal display apparatus comprising:
a surface light source device including a light source body that has an internal space, a partition wall disposed in the internal space to divide the internal space into a plurality of discharge spaces, the partition wall having end portions that make contact with inner surface of the light source body and a throughhole, through which the discharge spaces are connected to each other, and a barrier that is disposed in a discharge space and adjacent to the throughhole to restrict a flow of plasma generated from a discharge gas through the throughhole; and
a liquid crystal display panel including liquid crystal to convert a light generated from the surface light source device into an image light.

* * * * *